United States Patent [19]

Nakanowatari

[11] Patent Number: 5,227,904
[45] Date of Patent: Jul. 13, 1993

[54] FERROELECTRIC LIQUID CRYSTAL DEVICE

[75] Inventor: Jun Nakanowatari, Miyagi, Japan

[73] Assignee: Alps Electric Co., Ltd., Tokyo, Japan

[21] Appl. No.: 729,130

[22] Filed: Jul. 12, 1991

[30] Foreign Application Priority Data

Jul. 13, 1990 [JP] Japan .................. 2-185711
Jul. 2, 1991 [JP] Japan .................. 3-161903

[51] Int. Cl.$^5$ .................................... G02F 1/13
[52] U.S. Cl. ............................ 359/103; 359/76; 359/99; 359/104
[58] Field of Search ............ 359/99, 75, 76, 100, 359/103, 104

[56] References Cited

U.S. PATENT DOCUMENTS

| | | | |
|---|---|---|---|
| 4,084,884 | 4/1978 | Raynes | 359/103 |
| 4,666,253 | 5/1987 | Yoshida | 359/103 |
| 5,043,622 | 8/1991 | Sagong et al. | 252/62.9 |
| 5,069,531 | 12/1991 | Yamazaki et al. | 359/104 |

FOREIGN PATENT DOCUMENTS 0308129 12/1990 Japan .................. 359/63

Primary Examiner—William L. Sikes
Assistant Examiner—Huy K. Mai
Attorney, Agent, or Firm—Guy W. Shoup; B. Noel Kivlin

[57] ABSTRACT

A ferroelectric liquid crystal device includes a pair of substrates which has electrodes formed in an opposing spatial relation to each other. At least one of the electrodes is optically transparent. A parallel aligned, obliquely evaporated film is formed on each electrode. The paired substrates are sealed to provide a cell. A ferroelectric liquid crystal composition to which an ionic substance having a great mobility is added is placed in the cell to obtain the liquid crystal device. The addition of the ionic substance results in a low switching threshold voltage, a high response speed and good memory reproducibility. When the device is applied with an AC electric field prior to driving, display contrast is significantly improved.

8 Claims, 13 Drawing Sheets

[ TABLE 1 ]

| DEPOSITION ANGLE | SAMPLE NO. | TCNQ ADDED | Vth1 (V) | Vth2 (V) |
|---|---|---|---|---|
| 85° | 1 | NIL | — | 28 |
| | 2 | NIL | — | 24 |
| | 3 | NIL | — | 22 |
| | 4 | NIL | — | 23 |
| | 5 | NIL | — | 20 |
| | 6 | 1% | 8 | 19 |
| | 7 | 1% | 10 | 22 |
| | 8 | 1% | 6 | 23 |
| | 9 | 1% | 5 | 19 |
| | 10 | 1% | 5 | 18 |
| | 11 | 1% | 5 | 18 |
| | 12 | 1% | 4 | 19 |
| | 13 | 1% | 4 | 16 |
| 83° | 14 | 1% | 7 | 18 |
| | 15 | 1% | 10 | 21 |
| | 16 | 1% | 10 | 19 |
| | 17 | 1% | 14 | 17 |
| | 18 | 1% | 7 | 17 |
| | 19 | 0.5% | 8 | 16 |
| | 20 | 0.5% | 5 | 17 |
| | 21 | 0.5% | 6 | 21 |
| | 22 | 0.5% | 6 | 16 |
| 80° | 23 | 1% | 7 | 21 |
| | 24 | 1% | 9 | 23 |

FIG. 24

FERROELECTRIC LIQUID CRYSTAL DEVICE

BACKGROUND OF THE INVENTION

Field of The Invention

This invention relates to devices using ferroelectric liquid crystals.

Background of The Invention

In recent years, attention has been directed to ferroelectric liquid crystal devices owing to the facts that such devices have advantages over TN or STN devices using ordinary nematic liquid crystals in that the angle of visual field is wider and that since the time division drive is possible by utilization of the ability of memory, there is little lowering of contrast if the number of scanning lines of the device are increased. Accordingly, extensive studies have been made on the development for practical applications.

One of serious problems which is involved in the practical applications and which has been accepted as serious in the art is that the device is not resistant to mechanical impact. This is considered for the following reason: when the liquid crystal device sustains mechanical impact, the orientation of the liquid molecules contained in the device is changed and does not return to the original state. To overcome this, alignment films are replaced by polyimide rubbed films to make obliquely evaporated films which have been aligned parallel. As a consequence, the tilt angle of the ferroelectric liquid crystals is made so great as to reliably obtain a layer structure called a chevron structure of tilting in one direction. Thus, the resistance to mechanical impact becomes high.

Another problem to solve for practical applications which is still involved in the known ferroelectric liquid crystal device is that such a device is high in threshold voltage for switching and that when the device is driven at the same potential, the response speed is slow. This is because where the polyimide rubbed film is used as the alignment film, switching is made by the use of the twisted alignment, whereas with the obliquely evaporated film, switching proceeds in a uniform alignment as will be discussed hereinafter.

More particularly, the alignment direction of the spontaneous polarization of liquid crystal molecules in ferroelectric liquid crystal devices having parallel aligned, obliquely evaporated films may be schematically shown in FIGS. 16 and 17. The alignment of the spontaneous polarization of liquid crystal molecules in a cell indicated by arrows in the figures is a so-called "uniform" alignment in accordance with the direction of an external electric field E applied between upper and lower substrates 3, 4. If the external electric field E is reversed, the direction of the spontaneous polarization of all the liquid crystal molecules is reversed, thereby switching a display. Accordingly, with the case of a ferroelectric liquid crystal device 2 of the figures wherein the obliquely evaporated films are aligned parallel, it is necessary that the direction of the spontaneous polarization of all the liquid crystal molecules be reversed for switching. This will lead to a high threshold voltage and a slow response speed for the same level of drive voltage.

A further problem of the known liquid crystal device is that when it is subjected to time division drive, the reproducibility of memory is poor, resulting in an unstable display. In the ferroelectric liquid crystal device, the orientation of the liquid crystals is alternately changed by every reversal in polarity of the applied electric field and, thus, the direction of the spontaneous polarization of the liquid crystal molecules is alternately reversed. By the reversal of the spontaneous polarization, polarized charges are generated at the interface between the aligned films of the cell and the liquid crystal layer. Since the polarized charges act to suppress the reversal of the spontaneous polarization as will be caused by the reversal in polarity of the applied electric field, resulting in memory disorder. This is serious from the standpoint of the reliability of ferroelectric liquid crystal devices. Unless this problem is solved, it will be difficult to commercialize devices using ferroelectric liquid crystals.

SUMMARY OF THE INVENTION

It is accordingly an object of the invention to provide a ferroelectric liquid crystal device which can solve the problems of the prior art devices.

It is another object of the invention to provide a ferroelectric liquid crystal device whose threshold voltage for switching is low with a high response speed.

It is a further object of the invention to provide a ferroelectric liquid crystal device which has good reproducibility of memory and exhibits a stable display.

Broadly, the present invention provides a ferroelectric liquid crystal device which comprises a pair of substrates having, respectively, electrodes formed in face-to-face relation to each other, at least one of the electrodes being optically transparent, a parallel aligned, obliquely evaporated film formed on the electrode of the respective substrates, and a ferroelectric liquid crystal composition to which an ionic substance having a great mobility is added and which is confined between the substrates.

The obliquely evaporated film should preferably have a surface-modifying functional layer formed on the surface thereof.

The obliquely evaporated film should preferably be made of a member selected from silicon oxides, metal oxides, silicon nitrides, metal oxides and mixtures thereof.

Further, the device further comprises a means for applying an AC electric field between the facing electrodes for a given time prior to display drive.

When an ionic substance having a great mobility is added to the ferraelectric liquid crystal composition, space charges are formed in the liquid crystal composition. This permits the spontaneous polarization of the liquid crystal molecules, so that the direction of the spontaneous polarization of the liquid crystal molecules can be orientated within a bulk. Thus, the apparently produced space charges can be compensated with the movement of the ionic substance. It will be noted that the term "bulk" used herein is intended to mean an intermediate portion of the liquid crystal layer excluding the interfacial portions with the aligned films. Accordingly, the ferroelectric liquid crystal device of the invention wherein the parallel aligned, obliquely evaporated film is used as the aligned film may be eventually formed with a twisted alignment like devices using rubbed alignment films. This is why the device of the invention can be switched at a low threshold voltage and has a high response speed when driven at the same level of potential.

When the ferroelectric liquid crystal composition to which an ionic substance having a great mobility is added is introduced into a cell of the liquid crystal device which includes a pair of substrates, electrodes at least one of which is optically transparent and which are formed on the paired substrates in face-to-face relation, and parallel aligned, obliquely evaporated films formed on the respective substrate, there is some possibility that the ferroelectric liquid crystal composition and the ionic substance having a great mobility are separated from each other owing to the difference in adsorptivity on the obliquely evaporated film surface between the ferroelectric liquid crystal composition and the ionic substance. This leads to a higher concentration of the ionic substance in the vicinity of the charge port and a lower concentration at the inner portion. Thus, a non-uniform distribution of the ionic substance in the cell may result.

If any, this possibility will be overcome by forming a surface-modifying functional layer on the obliquely evaporated film surface. The presence of the functional layer will suppress the above separation phenomenon so that the ionic substance is uniformly distributed in the cell. Thus, the resultant ferroelectric liquid crystal device is so arranged as to have the ionic substance having a great mobility added uniformly. In order to obtain a highly reliable, obliquely evaporated film, it is preferred to use silicon oxides, metal oxides, silicon nitrides, metal nitrides or mixtures thereof whose oblique evaporation technique has been established.

As stated above, when ionic substances having a great mobility are added to ferroelectric liquid crystal composition, space charges are formed in the liquid crystal composition, making it possible to form a twisted alignment. This may undesirably lower contrast. To avoid this, it is preferred to use a means for applying an AC electric field between the facing electrodes for a certain time prior to display drive. Thus, the tilt angle of the alignment in the cell becomes small with an improvement in the contrast.

Table 1 illustrates values of VTh1 and VTh2 for sample using three deposition angles and varied amount of TCNQ.

PREFERRED EMBODIMENTS OF THE INVENTION

Figure 1:
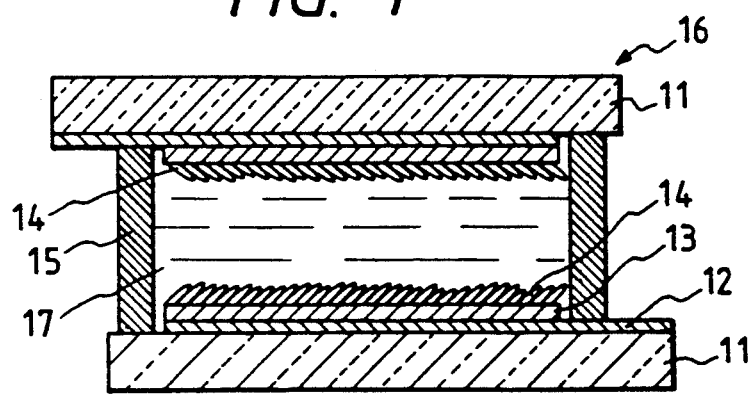
FIG. 1 is a schematic sectional view of a ferroelectric liquid crystal device according to one embodiment of the invention.

Reference is now made to the accompanying drawings and particularly, to FIG. 1.

FIG. 1 shows a ferroelectric liquid crystal device according to one embodiment of the invention. The device includes a pair of substrates 11, at least one of which is optically transparent. Each substrate 11 has a transparent electrode 12 made, for example, of indium-tin oxide (ITO). An insulating film 13 is formed on the transparent electrode 12 and is made, for example, of SIALON, aluminium oxide, silicon nitride, silicon oxide or the like. The thickness of the insulating film 13 is not critical and is generally in the range of approximately 50 to 300 nm. It is preferred that in order to reliably prevent electric short-circuiting between the substrates 11, the thickness should not be less than 150 nm. An alignment film 14 is formed on the insulating film 13. The film 14 is a parallel aligned, obliquely evaporated film which is made, for example, of silicon oxides, metal oxides, silicon nitrides, metal nitrides or mixtures thereof. The alignment film 14 is formed at a deposition angle of from 75° to 87°, preferably from 82° to 85° from the normal of the substrate with respect to the film surface. The thickness of the alignment film 14 is so controlled as to be in the range of from 100 to 2000 angstroms, preferably from 300 to 1000 angstroms.

The paired substrates 11 each having the transparent electrode 12, the insulating film 13 and the alignment film 14 are kept apart from each other through sealing members 15 in such a way that the respective alignment films 14 are facing each other, thereby providing a liquid crystal cell 16. The liquid crystal cell has a gap between the substrates 11 of approximately 2 micrometers. To make a constant gap and to improve the impact resistance of the liquid crystal cell 16, it is preferred that resin particles in the form of microspheres are placed between the substrates and heated while bringing the respective substrates to come close to each other, thereby melting the resin particles. After setting the gap at a predetermined level, the molten resin is solidified thereby forming a resin ring between the substrates as shown in the figure.

In the gap of the liquid crystal cell 16, there is sealed within a ferroelectric liquid crystal composition 17 to which an ionic substance having a great mobility is added.

The ionic substance is one which can be completely dissolved in ferroelectric liquid crystals or ferroelectric liquid crystal composition and which is able to be ionically dissociated and has a mobility greater than impurity ions which are ordinarily contained in liquid crystals. When determined from a waveform of an electric current at the time of application of a triangular or rectangular waveform, the mobility should preferably be not less than $1 \times 10^{-6}$ cm$^2$/V·second. Examples of the ionic substance satisfying the above requirement include tetracyanoquinodimethane (TCNQ, molecular weight 204), dimethyltetracyanoquinodimethane (molecular weight 232), tetrafluorotetracyanoquinodimethane (Molecular weight 276), tetracyanobenzoquinone (molecular weight 208), tetracyanodiphenoxydimetahne (molecular weight 280), tetracyanonaphthoquinodimethane (molecular weight 254), and the like. All of the substances have a mobility of not less than 1 to $5 \times 10^{-6}$ cm$^2$/V·second.

The composition of the ferroelectric liquid crystals are not critical and include, for example, smectic liquid crystals exhibiting a great spontaneous polarization, such as p-decyloxybenziliden-p'-amino-2-methylbutylcinnamate. Preferably, those liquid crystals which have a wide operational temperature range of from temperatures lower than normal temperatures, to high temperatures wherein a chiral smectic phase is developed, can be utilized.

The ionic substance having a great mobility which is added to the ferroelectric liquid crystal is used in an amount that permits at least 50% of charges produced at the interface through reversal of the spontaneous polarization of the ferroelectric liquid crystal. The amount of the ionic substance is in the range of from 0.01 to 1 wt % based on the ferroelectric liquid crystal.

The method of measuring the mobility of the ionic substance in a liquid crystal substance has not been established yet. Accordingly, the mobility is determined by a method which we have developed.

Figure 2:
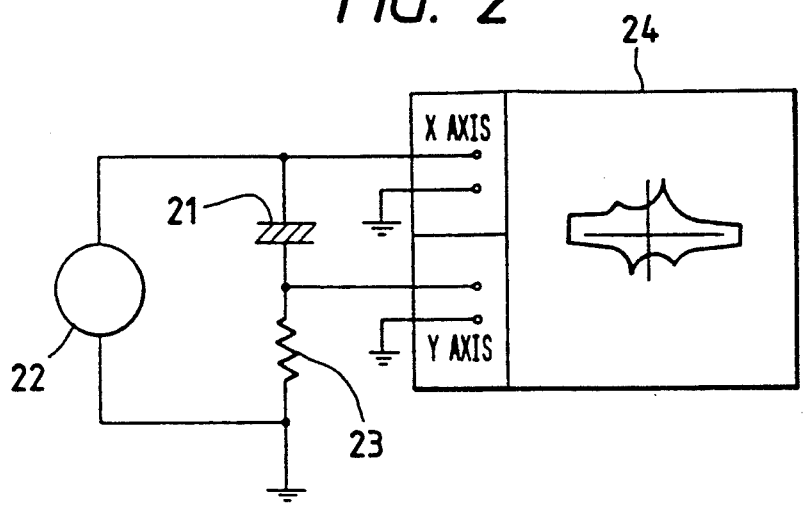
FIG. 2 is a schematic view of a device for measuring mobility.
Figure 3:
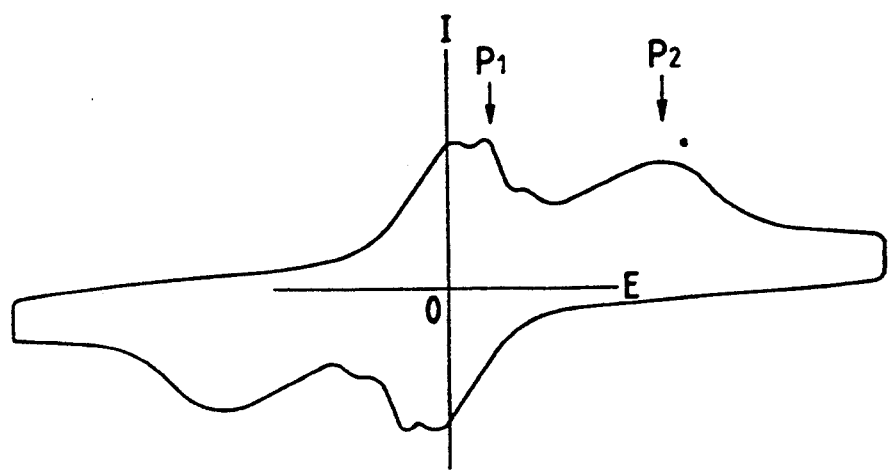
FIG. 3 is a graphical representation of a voltage-current characteristic obtained by use of the device of FIG. 2.

The measuring method is described. As shown in FIG. 2, a triangular wave is applied between electrodes of the liquid crystal cell 21 generated from a triangular wave generator 22 through a resistor 23. A current passing through the electrodes is taken as a Y axis and a voltage applied thereto is taken as an X-axis, and the current and voltage are recorded on an X-Y recorder 24 with memory capacity. As a result, there is obtained a graph shown, for example in FIG. 3. A peak $P_1$ of the current in the figure indicates a current generated by reversal of the spontaneous polarization of the liquid crystal molecules. Current peak $P_2$ indicates a current which results from the movement of an ionic substance (in this instance, TCNQ added in an amount of 0.01 wt %) in a liquid crystal composition (e.g. ZL1-3774, available from Merck Inc.). The mobility can be calculated from the position (voltage) on the X-axis of the current peak $P_2$ caused by the ionic substance. More particularly, the mobility is calculated from the voltage at the current peak $P_2$, the frequency of the applied triangular wave and the thickness of the liquid crystal layer in the cell. In this instance, the mobility is $1.4 \times 10^{-6}$ cm$^2$/V·second. The current peak $P_2$ is shifted by the action of the frequency of the triangular wave, e.g. it is shifted to a higher potential side for a higher frequency.

The ion mobility of ionic impurities contained in ferroelectric liquid crystals is generally in the range of $1-3 \times 10^{-7}$ cm$^2$/V·second when determined according to the measuring method set out above. On the other hand, ionic substances having a great mobility such as TCNQ exhibit a mobility of approximately $1-5 \times 10^{-6}$ cm$^2$/V·second. Thus, such substances can move at a rate which is ten times faster than that of ionic impurities.

Moreover, the insulating film 13 is provided between the transparent electrode 12 and the alignment film 14, so that the yield of the device can be improved while preventing electric short-circuiting within the liquid crystal cell.

EXAMPLE 1

The liquid crystal cell having such a structure as shown in FIG. 1 was fabricated using the following substances or materials. The alignment film used was a SiO deposited film with a thickness of about 500 angstroms, available from Nitto Kouki K. K., which was deposited at a deposition angle of 85° to 83° and which was aligned parallel. The cell gap was set at 2 micrometers. A ferroelectric liquid crystal composition having the following characteristics was ZL1-3774, available from Merck Inc., with or without addition of tetracyanoquinodimethane (TCNQ) having a mobility of $2 \times 10^{-6}$ cm$^2$/V·second in amounts of 0 (not added) to 1 wt %.

Spontaneous polarization: 28.9 n C/cm$^2$
Tilt angle: 25.5°
SmC*pitch: 4µ
$\Delta \epsilon$: −2.0
$\Delta$ n: 0.13
Transition point temperature
  (SmC*-SmA)+62° C.
  (SmA-Nem)+76° C.
  (Nem-Iso)+86° C.

Figure 4:
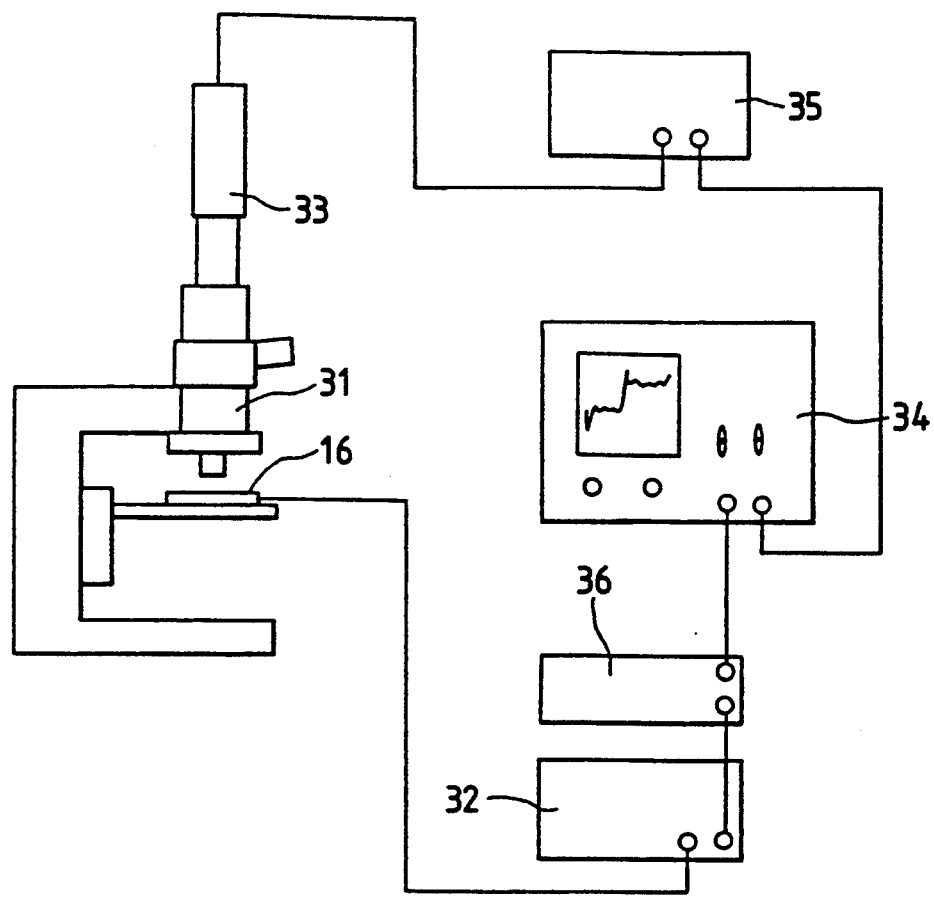
FIG. 4 is a schematic view of a device for measuring optical characteristics of a liquid crystal cell used in examples.
Figure 5:
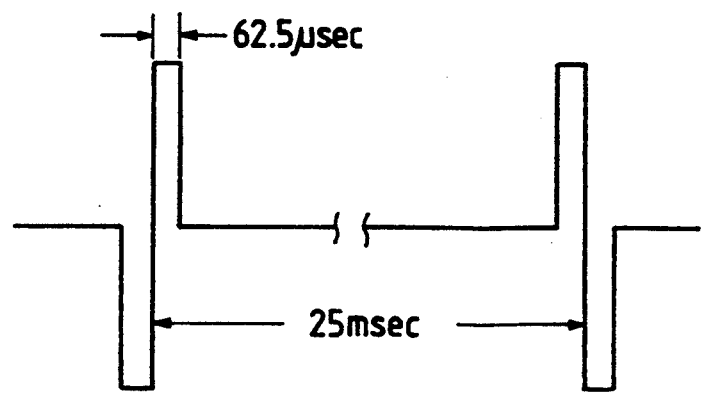
FIG. 5 is a view of a waveform of an applied voltage to a liquid cell used in examples.

The liquid cell 16 was set in a polarization microscope 31 as shown in FIG. 4, under which bipolar rectangular wave pulses with such a waveform as shown in FIG. 5 was applied between the transparent electrodes 12. The variation in transmitted light through the liquid crystal cell 16 which was caused by application of the pulses was detected by means of a photomultiplier 33 connected to an oscilloscope 34. Where the transmitted light quantity caused by the applied pulses was separated into two states, the potential was determined as a threshold voltage. In FIG. 4, reference numeral 35 indicates a power source for the photomultiplier 33 and reference numeral 36 indicates a pulse oscillator.

The alignment of the liquid crystal was judged in the following manner: the polarization microscope 31 was set in a cross Nicol state where the liquid crystal cell was placed on a rotary stage in an ordered state and rotated; and the molecular arrangement of the liquid crystal in the cell was determined as either a uniform state or a twisted state depending on whether an extinction position appears or not.

In the uniform state, the optical axes of the liquid crystal molecules in the cell are uniformly arranged in one direction, so that the extinction position appears at an angle where the optical axes and the polarization axis are coincident with each other. However, in the twisted state, the optical axes are not uniform along the thickness of the liquid crystal cell. Thus, when the cell is rotated on the stage, any extinction position does not appear. The threshold voltage in case of switching between the twisted states was taken as Vth1 and for the switching between the uniform states, the threshold voltage was taken as Vth2.

The values of Vth1 and Vth2 of various liquid crystal cells where the deposition angle for the alignment film and the amount of TCNQ were changed were measured, with the results shown in Table 1.

From Table 1, it will be seen that with the samples using a deposition angle of 85° and having no TCNQ, any value of Vth1 which is for switching between twisted states is not observed but only switching in the uniform state is observed. In constrast, with the sample wherein 1 wt % of TCNQ is added to the liquid crystal, both states of Vth1 and Vth2 are observed. With the samples using a deposition angle of 83°, both states of Vth1 and Vth2 are observed at TCNQ concentrations of 1 wt % and 0.5 wt %. With the samples using a deposition angle of 80° and a TCNQ concentration of 1 wt %, both states of Vth1 and Vth2 are observed.

Figure 6:
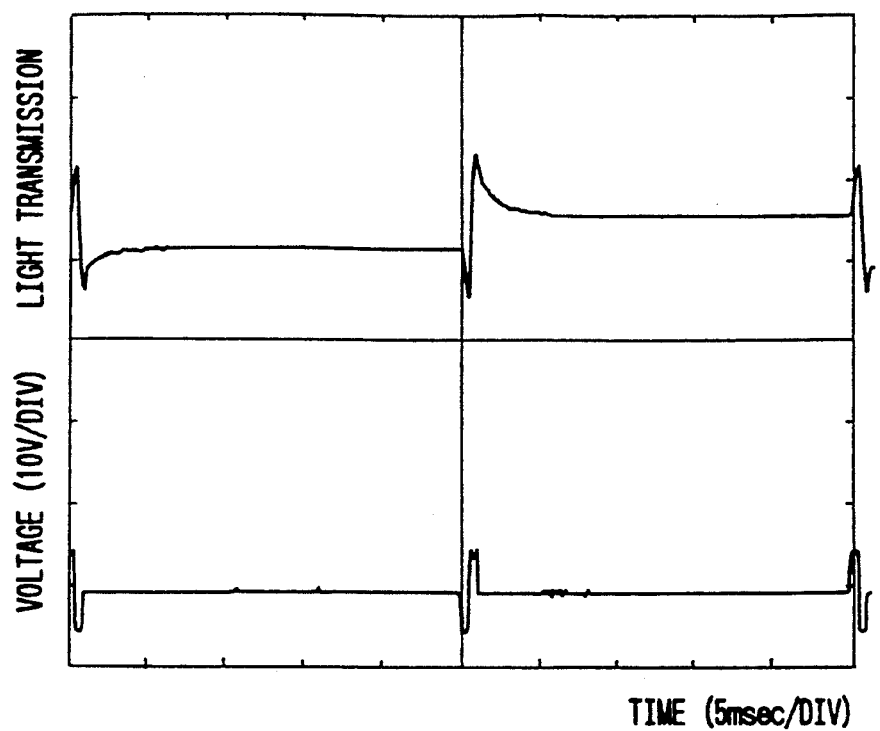
FIG. 6 is a graphical representation of a switching characteristic of a liquid crystal cell of Example 1 in a twisted alignment.
Figure 7:
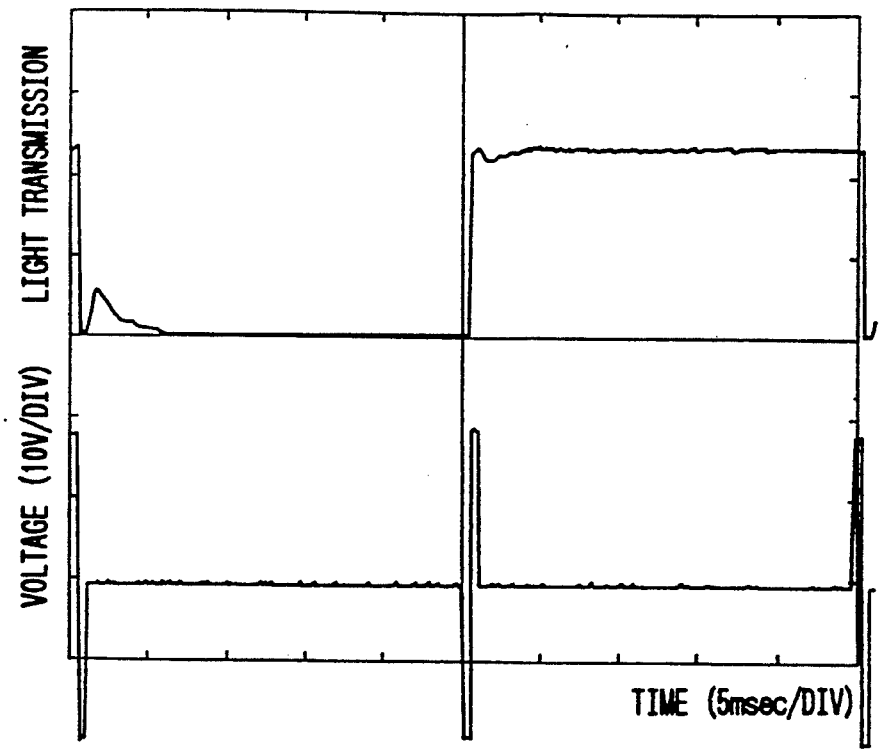
FIG. 7 is a graph showing a switching characteristic of a liquid crystal cell with a uniform alignment obtained in Example 1.

The variation in light transmission and the voltage applied to the liquid crystal cells in a typical twisted state which was observed in the above test are shown in FIG. 6. In FIG. 7, there are shown the variation in light transmission and the voltage applied to the liquid crystal cells in uniform state.

The stability of the liquid crystal cell of the invention against mechanical shocks was checked.

Figure 8:
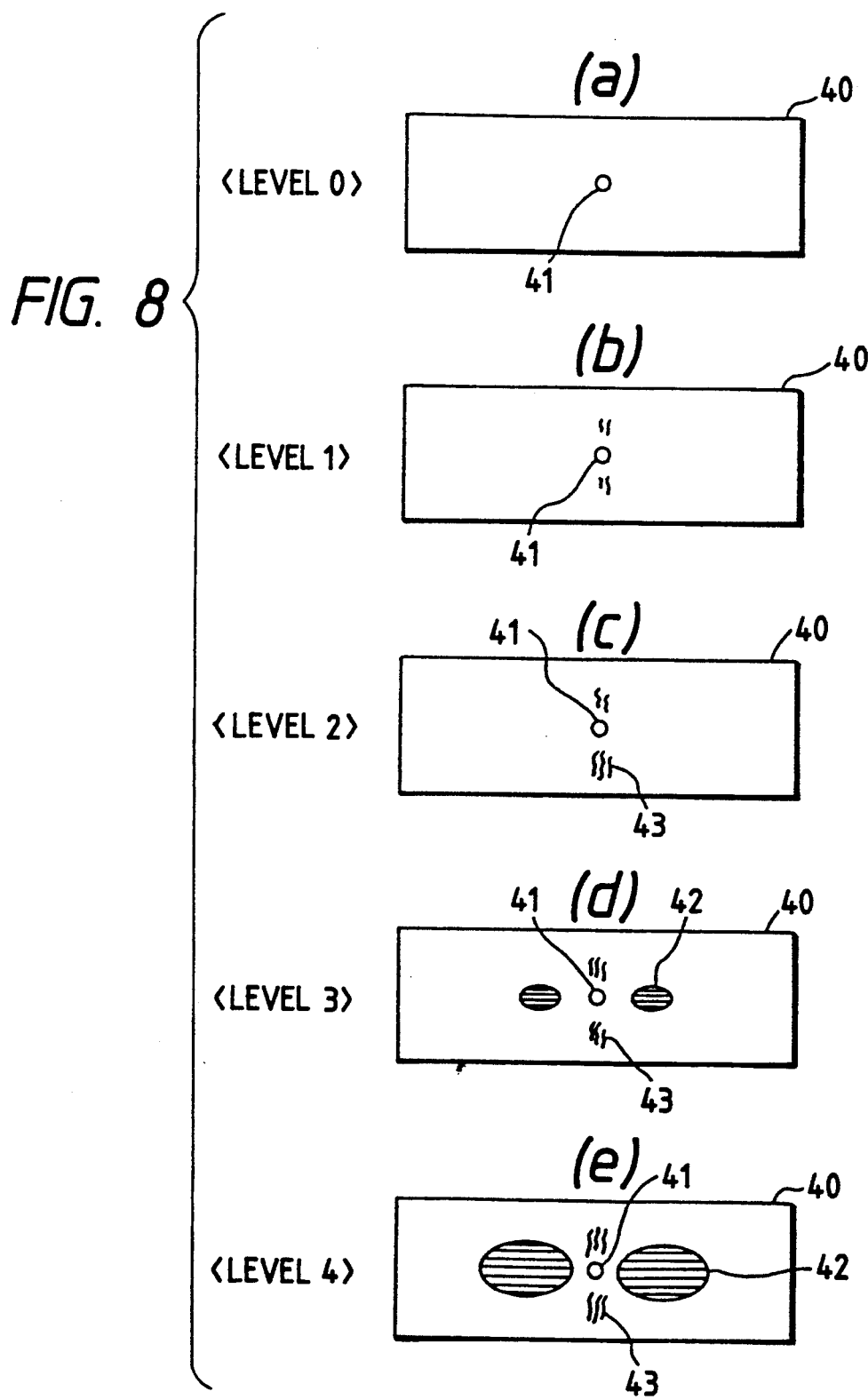
FIG. 8 is a schematic view of a liquid crystal cell whose degradation in alignment is shown for different levels.

Among the liquid crystal cells fabricated in the above test, a sample using a deposition angle of 85° and a TCNQ concentration of 1 wt % was selected as the Example of the invention, and a liquid crystal cell using a polyimide rubbed alignment film and the same liquid crystal composition as in the Example was provided for comparison. These liquid crystal cells were each placed in the measuring instrument shown in FIG. 4. While the stage was elevated and a pressure level (static pressure level) was monitored by the use of a push-pull gage, a central portion of the liquid crystal cell was pressed as shown in FIG. 8. The alignment state in a cross Nicol condition was visually observed by the use of the polarization microscope 31. The state was ranked into levels 0 to 4 depending on the area and degree of degradation of the alignment as shown in FIG. 8. The degradation states of the alignment of the samples the Example and the Comparative Example under different load conditions were compared with each other. In FIGS. 8(a) to 8(e), reference numeral 40 indicates a liquid crystal cell, reference numeral 41 indicates the pressed portion, reference numeral 42 indicates a striped structure, and reference numeral 43 indicates a zigzag structure. The levels are classified as follows: level 0 indicates no degradation of the alignment; level 1 indicates a slight degree of the zigzag structure produced above and below the pressed portion; level 2 indicates a clear zigzag structure; level 3 indicates development of small striped structures at the right and left of the pressed portion as viewed in the figure; and level 4 indicates development of large-sized striped structures.

Figure 9:
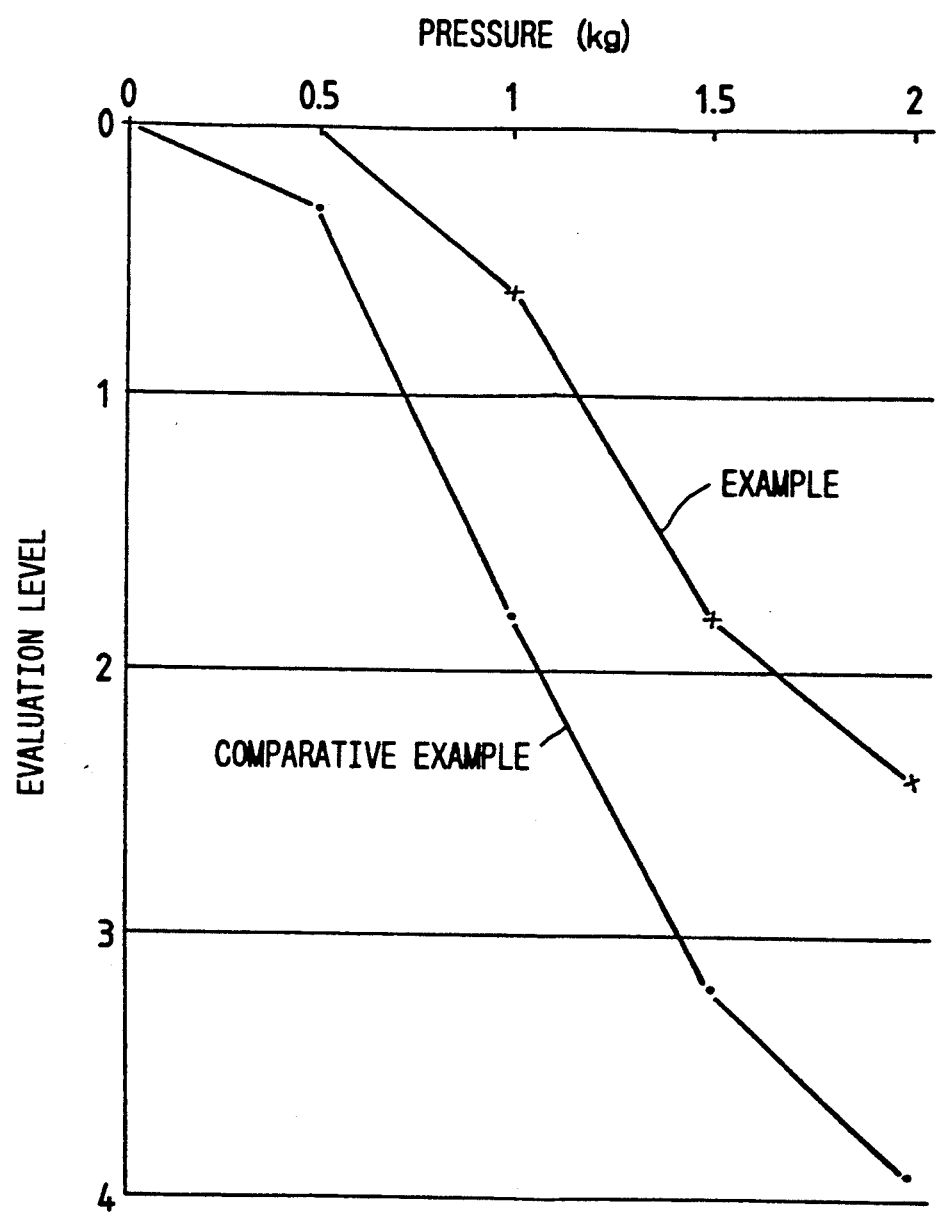
FIG. 9 is a graph showing the relation between the applied pressure and the alignment degradation level for liquid crystal cells of Example 1 and Comparative Example.
Figure 10:
FIG. 10 is a photograph showing a zigzag structure of a liquid crystal cell which is produced by application of pressure.
Figure 11:
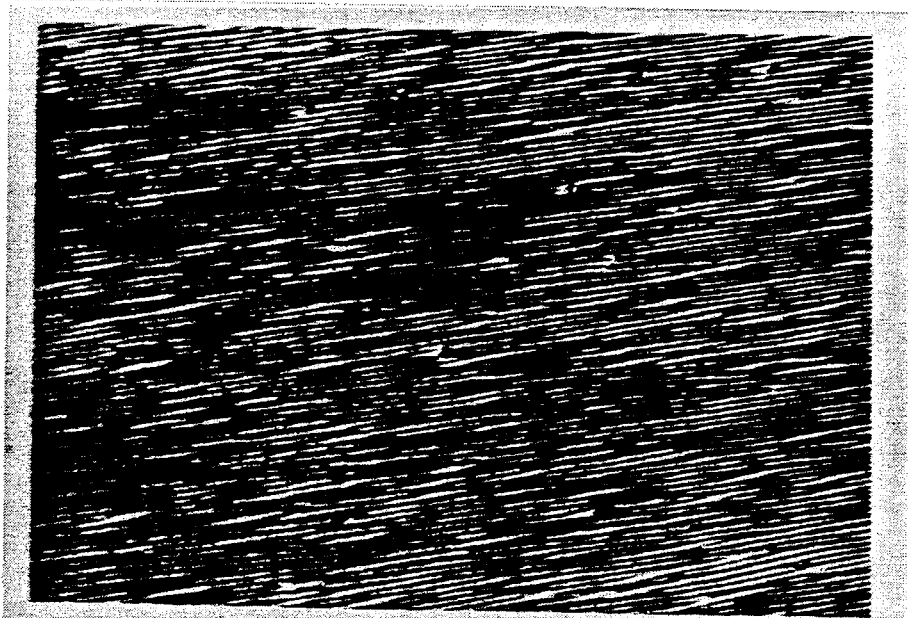
FIG. 11 is a photograph showing a striped structure of a liquid crystal cell under pressure.

The relation between the applied pressure and the alignment degradation level is shown in FIG. 9. FIG. 10 shows a typical zigzag structure observed during the above test. FIG. 11 shows a striped structure.

From FIG. 9, it will be seen that the liquid crystal cell of the Example suffers less alignment degradation than the Comparative Example and is thus confirmed to be more resistant to mechanical shocks.

Subsequently, bipolar pulses were applied to sites of the respective liquid crystal cells of the Example and the Comparative Example where the striped structure or zigzag structure are produced, followed by measurement of the quantity of transmitted light in On and Off states (1) before application of pressure, (2) after application of a load of 1 kg, and (3) after application of a load of 2 kg. The applied waveform is that shown in FIG. 5 with a frequency of 20 Hz and a potential of 24 V (liquid crystal cells of the Example) or 4 V (Comparative Example).

Figure 12:
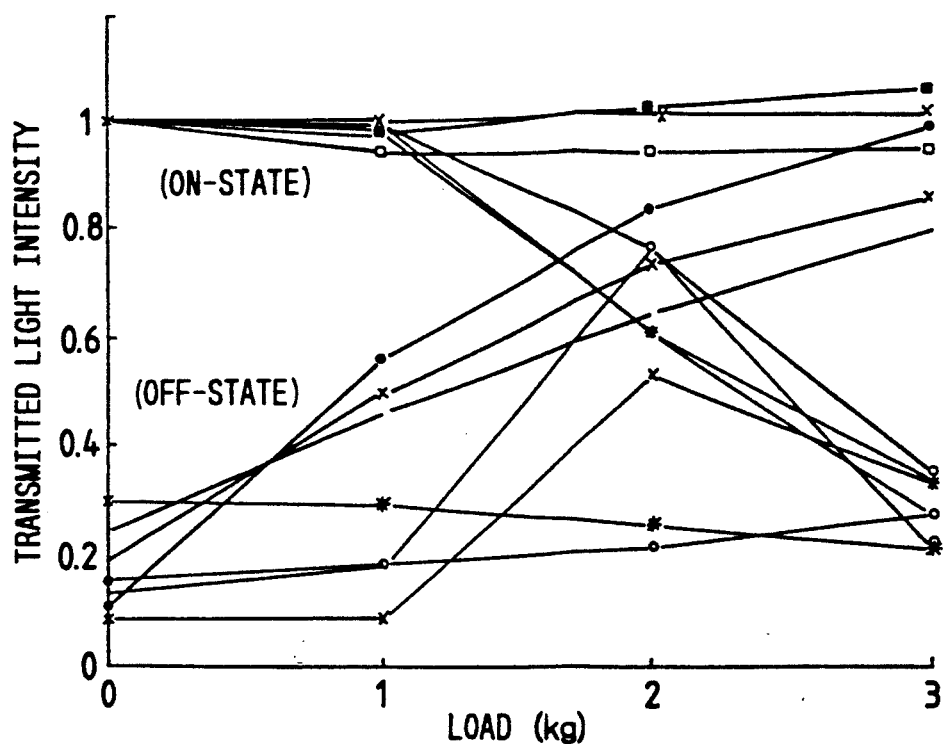
FIG. 12 is a graph showing the relation between the transmitted light intensity and the applied load of liquid crystal cells of Example 1 for On and Off states.
Figure 13:
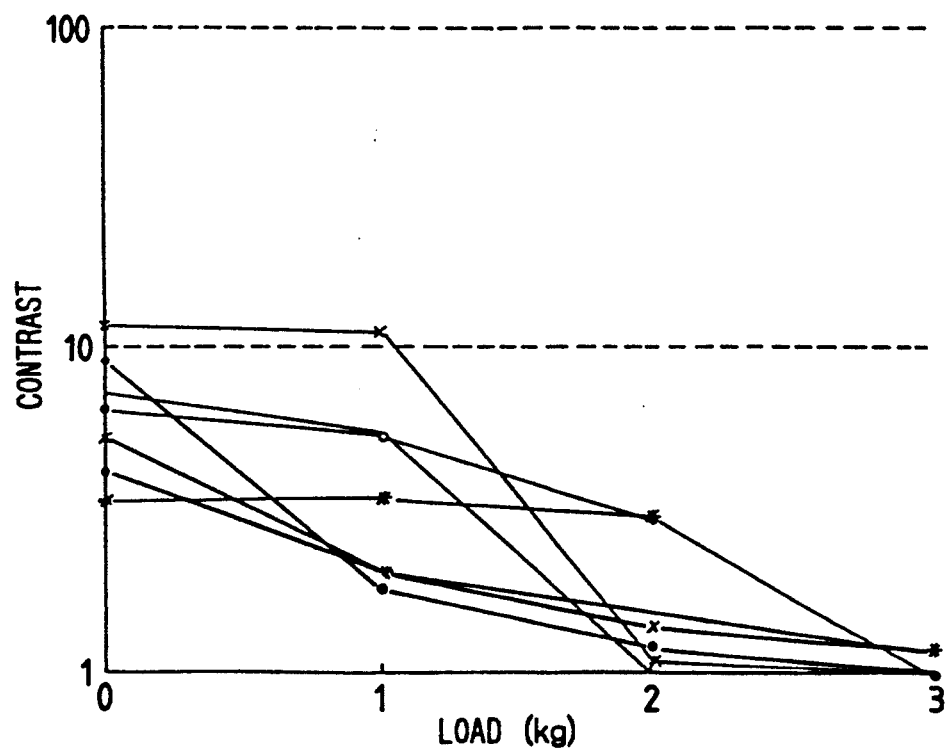
FIG. 13 is a graph showing the relation between the contrast and the applied load of liquid crystal cells of Example 1.

The variation in the transmitted light intensity of the liquid crystal cell of the Comparative Example in relation to the load is shown in FIG. 12. The data of FIG. 12 are expressed as a contrast=On-state transmitted light/Off-state transmitted light and shown in FIG. 13.

Figure 14:
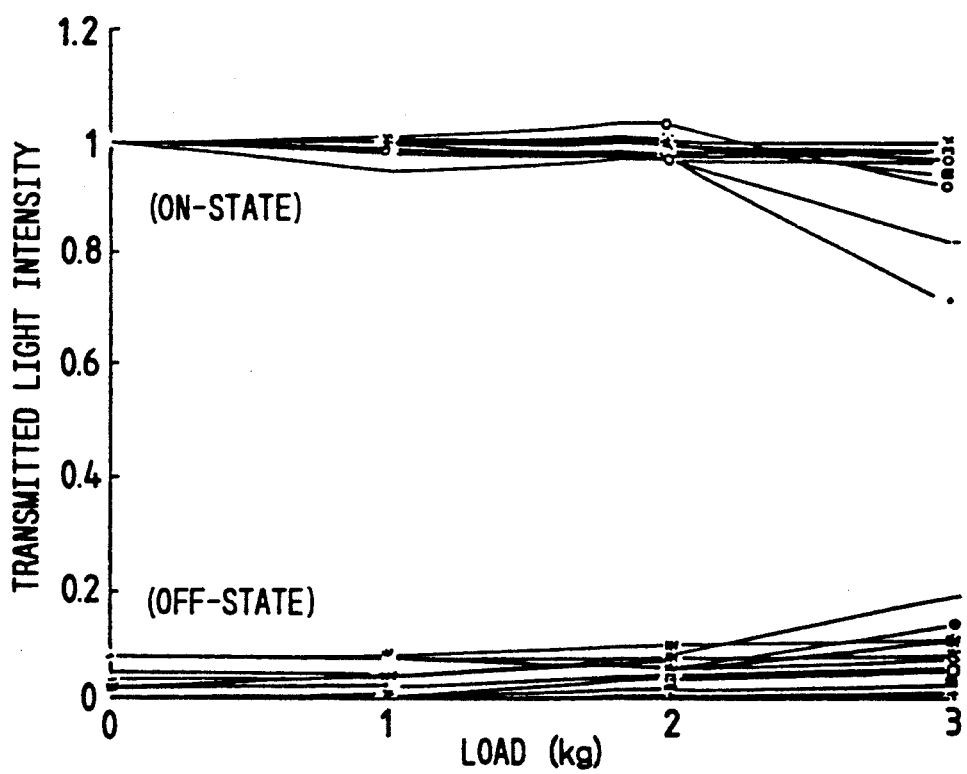
FIG. 14 is a graph showing the relation between the transmitted light intensity and the load of liquid cells of Example 1 for On and Off states.
Figure 15:
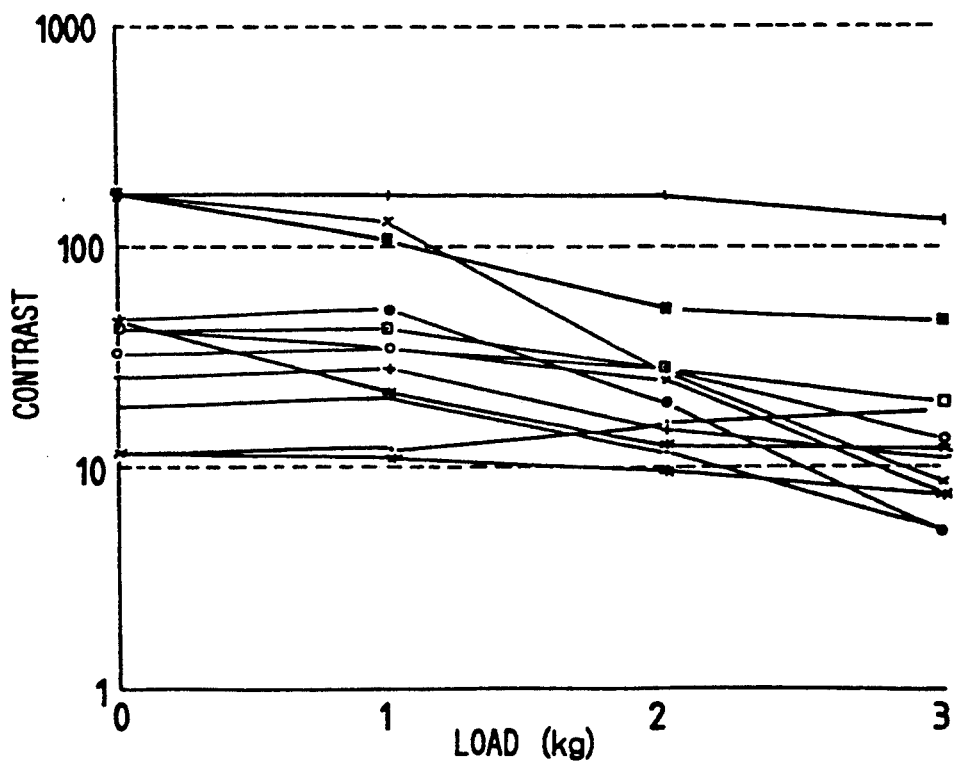
FIG. 15 is a graph showing the relation between the contrast and the applied load of liquid crystal cells of Example 1.
Figure 16:
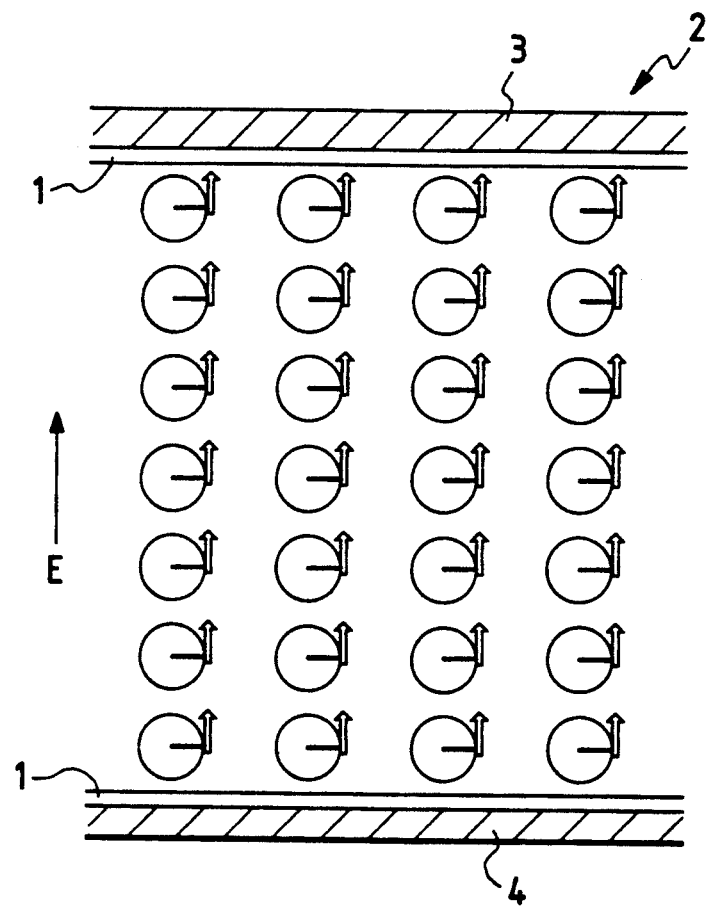
FIG. 16 is a schematic sectional view illustrating an arrangement of liquid crystal molecules in a known liquid crystal cell.
Figure 17:
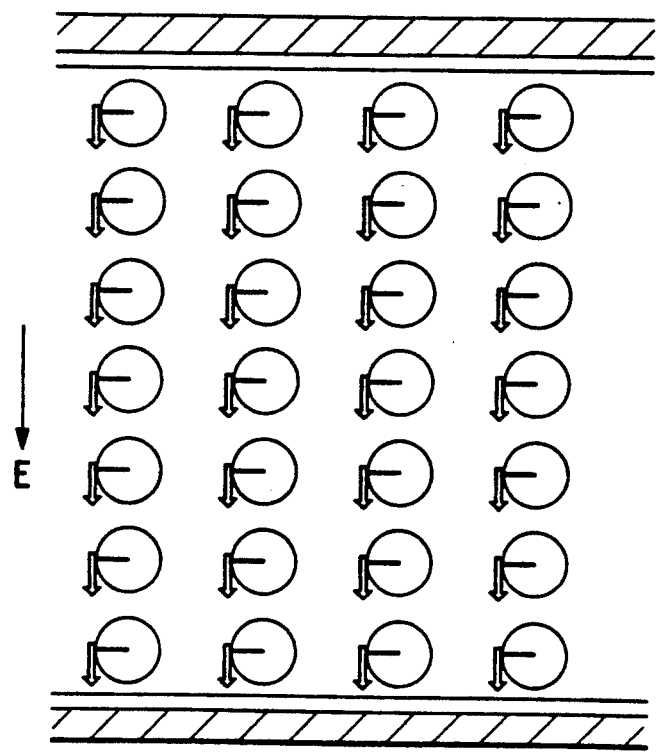
FIG. 17 is a schematic sectional view illustrating an arrangement of liquid crystal molecules in a known liquid crystal cell.

The variation in the transmitted light intensity of the liquid crystal cell of the Example in relation to the load is shown in FIG. 14. Likewise, the contrast is shown in FIG. 15.

As a result, it will be seen that the liquid crystal cell of the Comparative Example having the rubbed alignment film has a lower contrast at portions where the zigzag structure is to be formed when applied with a load of 1 kg and is also lower in contrast at a load of 2 kg at portions of the striped structure. At 3 kg, almost all the cells are free of any variation in the transmitted light between the On state and the Off state. With the liquid crystal cells of the Example, little variation in the optical characteristics is involved up to 2 kg. At 3 kg, half or more of the cells have a contrast of not less than 10. Thus, the cells of the Example are less likely to be degraded in alignment than those of the Comparative Example.

EXAMPLE 2

The general procedure of Example 1 was repeated except that a ferroelectric liquid crystal obtained by mixing ZLI-4655-100 and ZLI-4655-000 (Merck Inc.) at a mixing ratio of 3:1 was used and 0.2 wt % of TCNQ was used as as the ionic substance having a great mobility. Similar results as in Example 1 were obtained with respect to working characteristics and mechanical shock resistance.

EXAMPLE 3

The general procedure of Example 1 was repeated except that FELIX-010/2 (Hoechst CO., Ltd.) was used as a ferroelectric liquid crystal and 0.1 wt % of TCNQ was used as as the ionic substance having a great mobility. Similar results as in Example 1 were obtained with respect to working characteristics and mechanical shock resistance.

EXAMPLE 4

Figure 18:
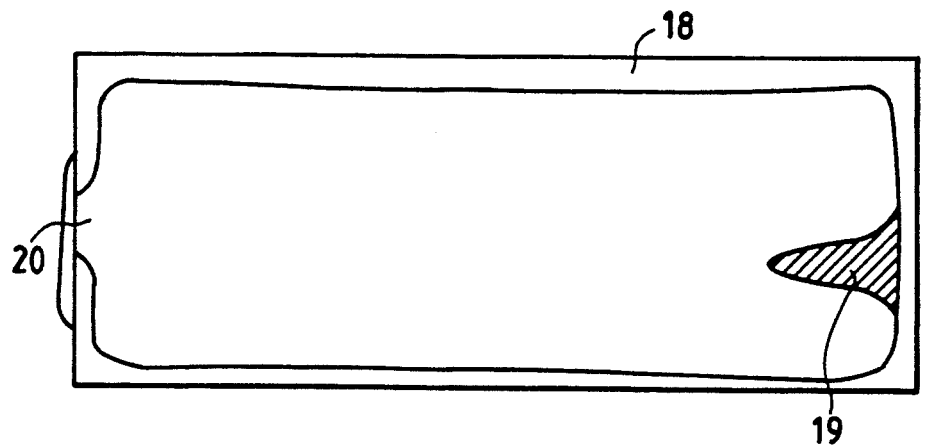
FIG. 18 is a schematic view showing separation of an ionic substance having a great mobility.

(1) When a liquid crystal to which anionic substance having a great mobility such as, for example, TCNQ is added is introduced into a cell having an obliquely deposited film whose surface has a fine irregular pattern, there may occur in the cell a chromatographic phenomenon where the liquid crystal composition is separated, thus leaving a non-uniform portion of alignment at a side opposite to the charge port as shown in FIG. 18. In FIG. 18, indicated at 18 is a sealant, at 19 is a alignment-degraded portion, and at 20 is a liquid crystal charge port. This phenomenon is considered to result from the difference in adsorptivity on the deposited film between the ferroelectric liquid crystal molecules and the ionic substance having a great mobility such as TCNQ.

To avoid the above, a solution of a polyimide (Optomer AL-1051, available from Nippon Synthetic Rubbers Co., Ltd.) diluted to a resin content of 0.5% was overcoated on the SiO obliquely evaporated film by means of a spinner in a thickness of about 8 nm.

Thus, the obliquely evaporated SiO film was covered with a thin polyimide layer on the surface thereof. As a result, the interactions with the liquid crystal molecules and an ionic substance having a great mobility such as TCNQ were greatly varied.

The liquid crystal cell was assembled by the use of a sealant, into which a ZLI-4655 liquid crystal to which 0.2 wt % of TCNQ was added was introduced. As a result, it was found that there was not any phase separation between the ferroelectric liquid crystal and TCNQ caused by the chromatographic phenomenon as would be often experienced in prior art, nor was there observed any degradation of the alignment.

(2) Polyvinyl alcohol (Gosenol, available from Nippon Synthetic Chem. Ind. Co.,Ltd.) was overcoated on an obliquely evaporated chromium film in a thickness of about 10 nm by means of a spinner.

Then, the above procedure (1) was repeated, thereby assembling a liquid crystal cell and introducing the liquid crystal into the cell. As a result, it was found that any separation of the ferroelectric liquid crystal and TCNQ owing to the chromatographic phenomenon was observed without any degradation of the alignment.

(3) A poly solution (Polix-002/3, available from Hoechst Co., Ltd.) was overcoated on an obliquely evaporated film of indium-tin oxide in a thickness of about 5 nm by means of a spinner.

Then, the above procedure (1) was repeated, thereby assembling a liquid crystal cell and introducing the liquid crystal into the cell. As a result, it was found that any separation of the ferroelectric liquid crystal and TCNQ owing to the chromatographic phenomenon was observed without any degradation of the alignment.

(4) A thin layer of poly-p-xylene (available from Union Carbide Co., Ltd.) was overcoated on an obliquely evaporated SiO film by vacuum deposition.

Then, the above procedure (1) was repeated, thereby assembling a liquid crystal cell and introducing the liquid crystal into the cell. As a result, it was found that any separation of the ferroelectric liquid crystal and TCNQ owing to the chromatographic phenomenon was observed without any degradation of the alignment.

Figure 23:
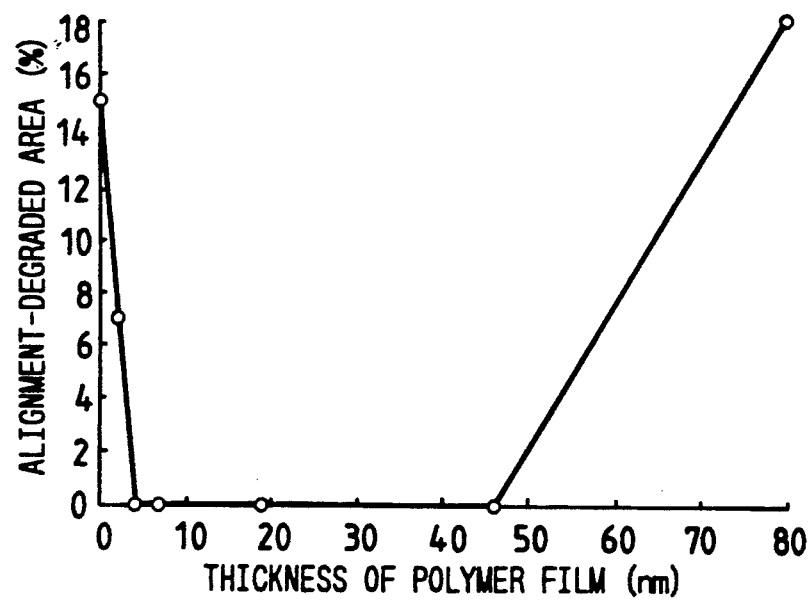
FIG. 23 is a graph showing the relation between the thickness of a surface-modifying functional layer formed on the surface of an obliquely evaporated film and the area by % where the alignment is degraded.

The thickness of the surface-modifying functional layer or polymer layer formed on the surface of the obliquely evaporated film is generally within a range of about 1 nm to about 60 nm as shown in FIG. 23, within which an effect of preventing the degradation of the alignment was recognized. When the thickness is in the range of from about 3 to about 46 nm, the preventing effect becomes most pronounced.

In the above examples, the use of the polymer films formed on the obliquely evaporated film has been described. The surface-modifying functional film or layer is not limited to those polymers set forth above. For example, similar results are obtained when using silane coupling agents such as SH 6020 and SH 6040 available from Toray Silicone Co., Ltd. for the formation of the layer on the deposited film surface.

EXAMPLE 5

All segments of the sample of Example 2 were applied with 20 V rectangular wave at one side. The initial frequency used was 5 KHz and was gradually reduced. The application at 200 Hz was kept for 5 seconds, after which the frequency was gradually increased and returned to 5 KHz. The time of from commencement of the application of the 20 V rectangular wave until completion was about 30 seconds.

Figure 19:
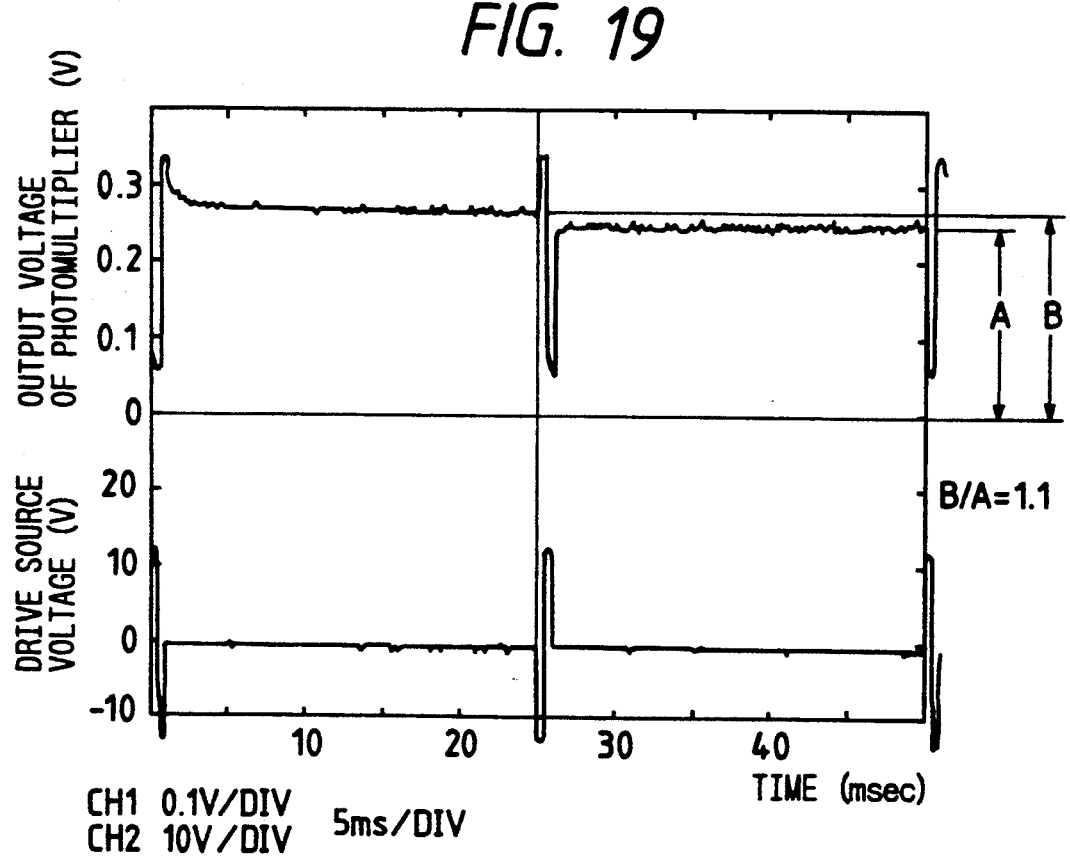
FIG. 19 is a graph showing a contrast of a ferroelectric liquid crystal device prior to application of an AC electric field.

In FIG. 19, there is shown an output (light transmission) from a photomultiplier of the ferroelectric liquid crystal device sample prior to the above application which was driven with a peak potential of 12 V having a waveform as shown in FIG. 5. In the figure, A indicates a value proportional to the quantity of transmitted light in the dark, B indicates a value proportional to the quantity of transmitted light in the light, and B/A indicates a contrast.

Figure 20:
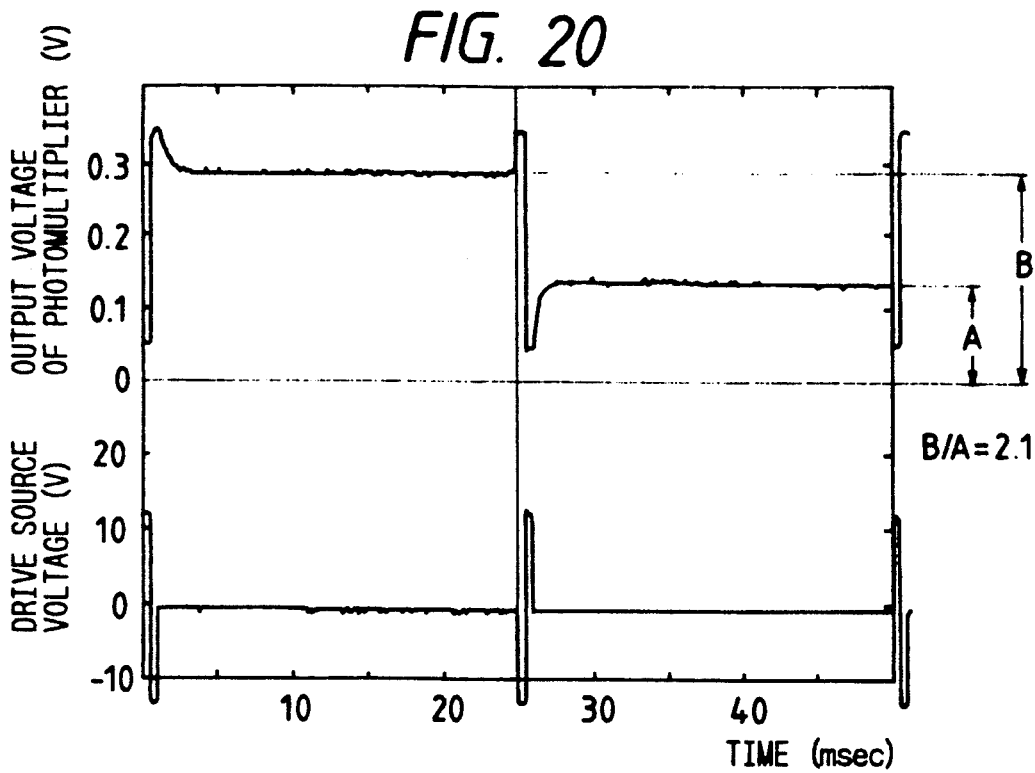
FIG. 20 is a graph showing a contrast of a ferroelectric liquid crystal device after application of an AC electric field.

In FIG. 20, there is shown an output (light transmission) from a photomultiplier of the ferroelectric liquid crystal device sample after the application, which was driven with a peak potential of 12 V having a waveform as shown in FIG. 5. In the figure, A, B and B/A have the same meanings as indicated with respect to FIG. 19, respectively. From the figures, it was confirmed that the contrast was 1.1 prior to the application and was improved to 2.1 after the application.

Figure 21:
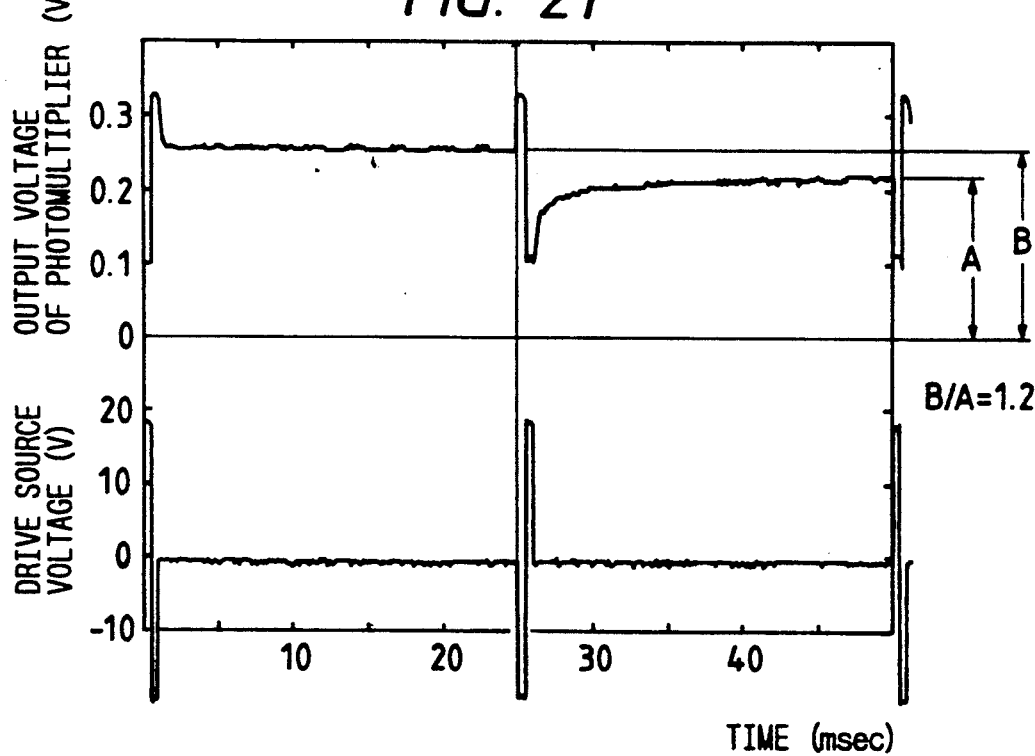
FIG. 21 is a graph showing a contrast of a ferroelectric liquid crystal device prior to application of an AC electric field.

In FIG. 21, there is shown an output (light transmission) from a photomultiplier of the ferroelectric liquid crystal device sample after the application which was driven with a peak potential of 20 V having a waveform as shown in FIG. 5. In the figure, A, B and B/A have the same meanings as indicated with respect to FIG. 19, respectively.

Figure 22:
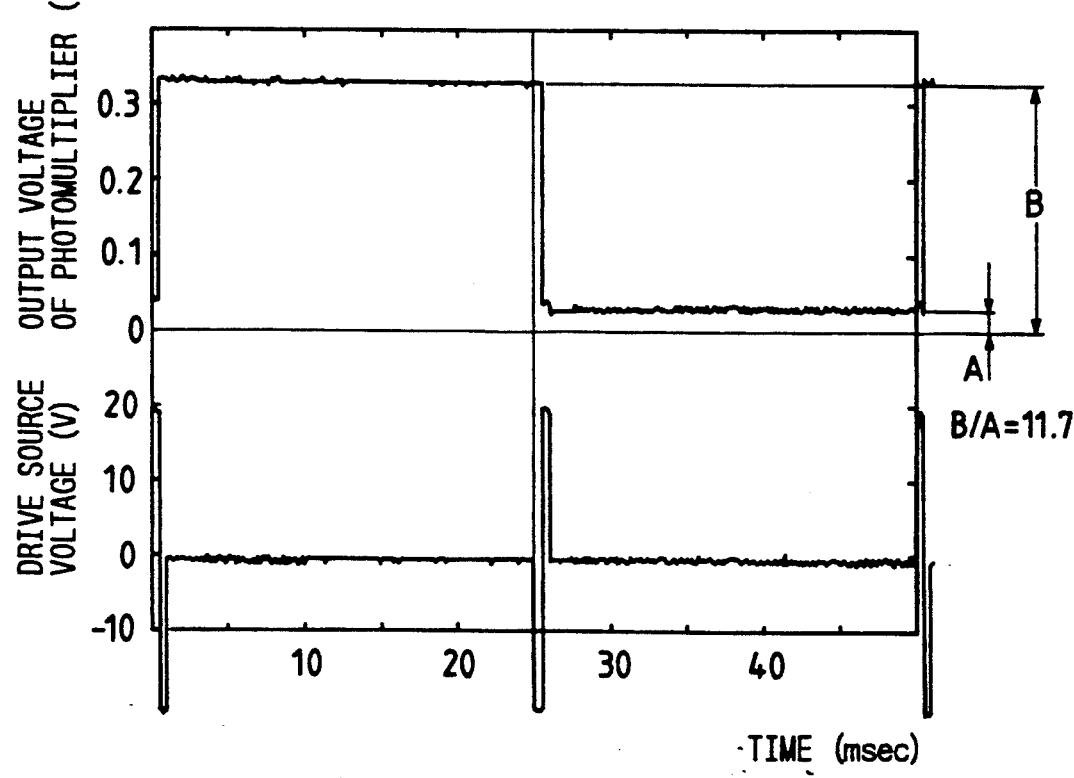
FIG. 22 is a graph showing a contrast of a ferroelectric liquid crystal device after application of an AC electric field.

In FIG. 22, there is shown an output (light transmission) from a photomultiplier of the ferroelectric liquid crystal device sample after the application, which was driven with a peak potential of 20 V having a waveform as shown in FIG. 5. In the figure, A, B and B/A have the same meanings as indicated with respect to FIG. 19, respectively. From the figures, it was confirmed that the contrast was 1.2 prior to the application and was significantly improved to 11.7 after the application.

The improvement of the contrast set forth in the above example is attained by applying, to a liquid crystal cell containing a liquid crystal, an AC electric field of from 3 V to 30 V, perferably from 5 V to 15 V and from 20 Hz to 20 KHz, preferably from 200 Hz to 5

KHz, per unit micrometer in thickness of the liquid crystal layer, for from 5 seconds to 60 seconds.

When the electric field is applied, the application of an AC electric field with a higher frequency is more effective in improving the contrast.

In some cases, the duration of the improving effect was scattered depending on ambient conditions where the ferroelectric liquid crystal device has been stored. This will be beneficially overcome by providing a means for applying an AC electric field prior to driving and applying the AC electric field for a certain time, by which the device can be driven in a condition where the contrast is invariably improved.

As will be apparent from the foregoing, a ferroelectric liquid crystal device of the invention is so arranged that a ferroelectric liquid crystal composition to which an ionic substance having a great mobility is added is placed in a cell which includes a pair of substrates having, respectively, electrodes in face-to-face relation at least one of which is optically transparent, a parallel aligned, obliquely evaporated film formed on each electrode. This arrangement permits switching at a low threshold potential and a high response speed when driven at the same potential level.

When a surface-modifying functional layer is formed on the respective obliquely evaporated films, the resultant device exhibits a uniform display quality in the cell.

For the obliquely evaporated film, there are used silicon oxides, metal oxides, silicon nitrides, metal nitrides or mixtures thereof since their oblique evaporation technique has been reliably established, thus ensuring reliable formation of an obliquely evaporated film.

Moreover, when the means for applying an AC electric field to the facing electrodes prior to display is used to apply an AC electric field, the contrast can be improved.

What is claimed is:

1. A ferroelectric liquid crystal device which comprises a pair of substrates having, respectively, electrodes formed in opposing spatial relation to each other, at least one of the electrodes being optically transparent, a parallel aligned, obliquely evaporated film formed on the electrode of the respective substrates, and a ferroelectric liquid crystal composition to which an ionic substance having a great mobility is added and which is confined between the substrates.

2. The device according to claim 1, wherein said ionic substance is added in an amount of from 0.01 to 1 wt % of the ferroelectric liquid crystal composition.

3. The device according to claim 1, wherein said ionic substance has a mobility of not less than $1 \times 10^{-6}$ cm$^2$/V·second.

4. The device according to claim 1, further comprising a surface-modifying functional layer formed on each obliquely evaporated film.

5. The device according to claim 4, wherein said surface-modifying functional layer is made of a polymer.

6. The device according to claim 4, wherein said surface-modifying functional layer has a thickness of from 3 to 60 nm.

7. The device according to claim 1, wherein said obliquely evaporated film is made of a member selected from the group consisting of silicon oxides, metal oxides, silicon nitrides, metal nitrides and mixtures thereof.

8. The device according to claim 1, further comprising a means for applying an AC electric field between the facing electrodes for a given time prior to display drive.

* * * * *